United States Patent

[11] 3,601,676

[72] Inventors Martin O. Halfhill;
Frank J. Sordello, both of San Jose, Calif.

[21] Appl. No. 851,692
[22] Filed Aug. 20, 1969
[45] Patented Aug. 24, 1971
[73] Assignee Information Storage Systems, Inc. Cupertino, Calif.

[54] BALANCE CIRCUIT FOR DC SERVOS
7 Claims, 2 Drawing Figs.

[52] U.S. Cl. .......... 318/592, 318/632
[51] Int. Cl. .......... G05d 23/275
[50] Field of Search .......... 318/20.250, 20.530, 20.532, 20.534, 20.593

[56] References Cited

UNITED STATES PATENTS

| | | | |
|---|---|---|---|
| 3,353,161 | 11/1967 | Toscano | 318/162 X |
| 3,358,201 | 12/1967 | Jones | 318/30 X |
| 3,393,588 | 7/1968 | Broome | 318/18 X |

*Primary Examiner*—Benjamin Dobeck
*Attorney*—Robert B. Crouch

ABSTRACT: A balance circuit for neutralizing offsets and drift of all inputs to the summing amplifier of a DC servo including: a balance amplifier for comparing the drive signal applied to a servo controlled motor with selected inputs to the summing amplifier to determine any difference therebetween and developing a balance signal for feedback to the input of the summing amplifier which is equal to, but out of phase with the difference, and circuitry for applying the balance signal during both the fine and coarse position steps of the servo operation.

PATENTED AUG 24 1971 3,601,676

INVENTOR.
Martin O. Halfhill
and
Frank J. Sordello
BY Robert B. Crouch

BALANCE CIRCUIT FOR DC SERVOS

BACKGROUND

In presently known electronic circuitry initial errors exist, termed offsets, due to departures of component characteristics from their ideal performance specifications. In addition the semiconductors employed in the logical components of the circuits are subject to drift i.e. variations in the normal output values due to aging and temperature changes. The initial tolerances or offsets plus the long term changes in component output which occur with time and/or temperature variations are of particular interest in connection with DC servo circuits, since such changes produce erroneous of false position error signals for the servo. These false error signals energize the servo to attempt to neutralize the aggregate offset and drift of the circuit components, thus interjecting a position error into the system. In the conventional servosystem which involves a number of inputs to a summing amplifier, the aggregate offset and drift is assumed to be constant. A potentiometer is connected to the summing amplifier and adjusted to balance out all output of the summing amplifier in excess of the position error signal. This is accomplished by setting all the servosystem inputs to the summing amplifier to zero, measuring the output and then adjusting the potentiometer to bring the output to zero. With this approach the potentiometer does not track the drift, so variation in the amount of drift due to aging of the semiconductors in the circuitry are ignored. Periodic adjusting of the potentiometer is thus required to accommodate the aging of the semiconductors as well as variations in voltage and temperature changes.

INVENTION

The shortcomings of the prior known devices are avoided in the present invention by provision of a balance network for automatically balancing the offset and drift present in a DC servosystem. This is accomplished in the present invention by provision of means for developing a balance signal from the motor drive signal during the fine position step of the servo operation and means for feeding the balance signal back to the input of the summing amplifier during both the fine and coarse position steps of the servo operation.

Figure 1:
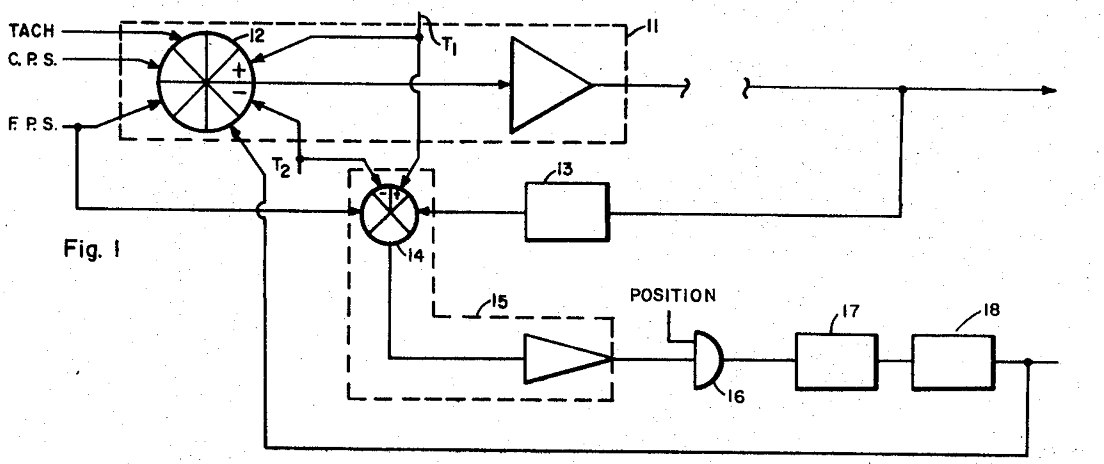
Figure 2:
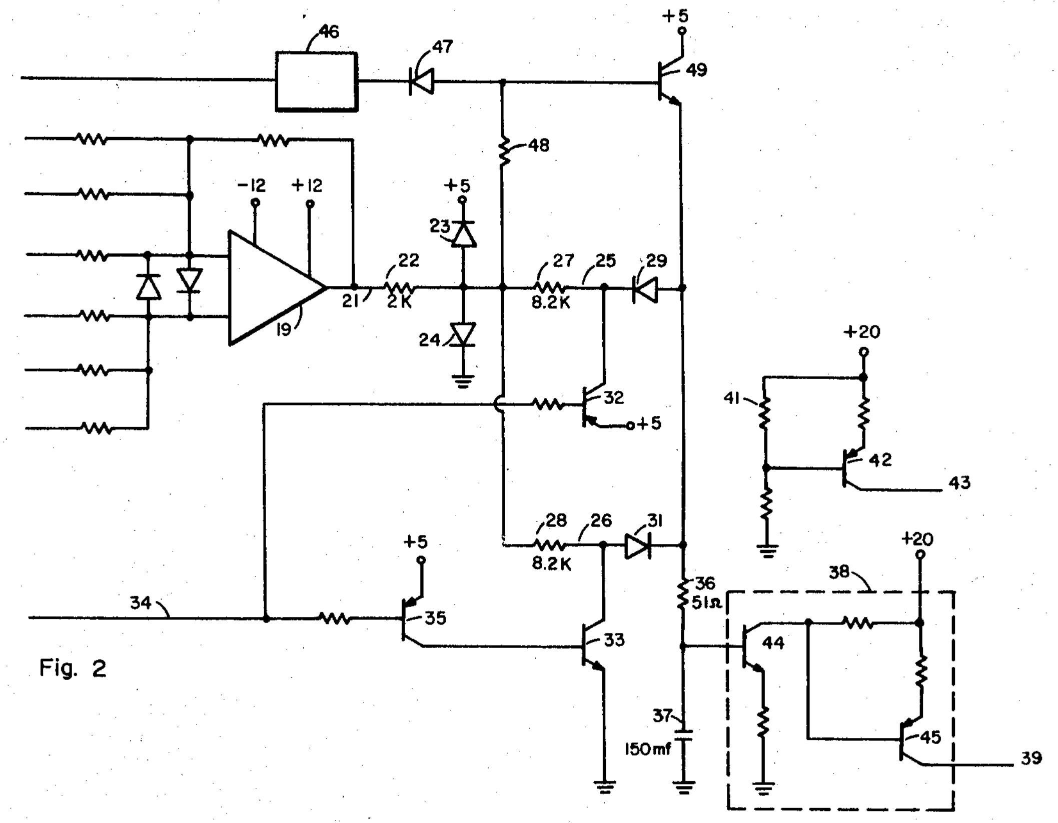

Objects and many of the attendant advantages of this invention will be readily understood by reference to the following detailed description of embodiments of the invention as illustrated in the accompanying drawings wherein:

FIG. 1 is a diagrammatic view of a servosystem embodying the balance circuit of the present invention; and FIG. 2 is a circuit diagram of the balancer of FIG. 1.

The balance circuit of the present invention has particular application with DC servos intended for positioning a load with a high degree of accuracy at selected locations within a given range of movement. An example of such an application occurs in connection with a magnetic data storage device wherein an array of read/write heads cooperates with a rotating stack of recording disks. In such devices an actuator may be controlled by a DC servo to position the read/write heads radially of the disks at selected track locations. This requires a coarse position step for moving the heads to the vicinity of the desired track and a fine position step to position the heads precisely at the track centerline and maintain them in position. The coarse positioning is conventionally done by a DC servosystem in response to various inputs, such as, a position signal, tachometer signal etc. The fine positioning may be done by a mechanical detent or, as described in application 792,343 of Brunner, Martin and Wilford, by a fine position servo. In either case offsets and drift in the DC components of the servo produce a false error signal which must be neutralized to allow precise positioning of the heads. Since the effective inputs to the servo are different during the coarse and fine positioning steps, some means is required for determining the amount of offset and drift to be balanced in both cases. In the present invention this is accomplished by provision of means for determining the proper balance signal during the fine positioning step and then applying the same balance signal to the servo during the coarse positioning step.

A circuit for balancing offsets and drift is illustrated in FIG. 1 in connection with a summing amplifier 11 of a DC servo. The amplifier 11 includes a summing junction 12 which receives a number of inputs, such as, tachometer signals, coarse position signals, fine position signals, temperature compensation signals etc. The output of the summing amplifier, becomes a motor drive signal and is connected to an actuator or motor (not shown). The motor drive signal is also connected through an inverter 13 as one input to a summing junction 14 of a balancer summing amplifier 15. The remaining inputs to the junction 14 are those inputs to the amplifier 11 which are significant during the fine positioning step, that is, the fine position signal and temperature compensation signal. The combined fine position and temperature compensation signals from a reference level and are added algebraically to the inverted motor drive signal to produce a balance signal which is equal in magnitude to, but 180° out of phase with, the aggregate offset and DC drift in the summing amplifier 11. The summing performed by the summing junction 14 is done on a unit basis in order to negate the effects of the gain of amplifier 11. This analog balance signal is then amplified and applied to a coincidence analog gate 16 where it is gated by a position signal which blocks the balance signal when the coarse position step is initiated and passes the balance signal when the coarse position step is completed. A low-pass filter 17 limits the bandwidth of the balance servo to a few Hertz. The filtered balance signal is stored in the filter, then passed to a buffer amplifier 18 and fed back to the summing junction 12 of the summing amplifier 11. Since the balance signal is 180° out of phase with the motor drive signal derived from the amplifier 11, it neutralizes the aggregate offset and drift component of the motor drive signal when applied to junction 12.

During the fine positioning step the effective inputs to the summing amplifier 11 are also applied to the balancer summing amplifier 15, so that the aggregate offset and drift can be determined from comparison of the motor drive signal and the effective inputs from which it is derived. The resultant difference is the balance signal which is stored in the filter and fed back to the amplifier 11 during the fine positioning step. During the coarse positioning step the effective inputs to the amplifier 11 are materially larger than those to the balancer amplifier 15, and the comparison affected by the balancer amplifier will not isolate the aggregate offset and drift. Accordingly, the balancer amplifier is gated out during the coarse positioning step and the balance signal is stored in the filter is applied to the input of the amplifier 11. This approach, which has the inherent advantage of simplicity, takes advantage of the fact that the accuracy requirements of the servosystem are most precise during the fine positioning step. However, the opposite approach could be employed, if desired, by connecting the effective inputs during the coarse positioning step to both summing amplifiers.

The input to the inverter 13 may be derived from the summing amplifier, the motor or somewhere in between depending upon the accuracy required for the system and the amount of offset and drift introduced between the summing amplifier and the motor. If it is necessary to neutralize all of the aggregate offset and drift, the motor drive signal should be taken off across the motor. However, if it is sufficient to neutralize the major portion of the offset and drift, the motor drive signal may be taken off at the output of the summing amplifier.

Referring to FIG. 2 of the drawing, a preferred embodiment of a balance circuit according to the present invention is illustrated as including a summing amplifier 19 which consists of a Fairchild 709-type operational amplifier and associated feedback and summing resistors. The amplifier is connected to a pair of −12-volt and a +1-volt power sources and the output of the amplifier is taken along line 21 through a resistor 22 and between a pair of clamping diodes 23 and 24. Diode 23 is connected between output line 21 and a +5-volt power source while diode 24 is connected between line 21 and ground. The two diodes limit the swing of the output signal on line 21 between +5 and ground to stay within the range of the analog gating circuitry. Line 21 is connected to the gating circuitry which includes two parallel lines 25 and 26, each of which has a resistor 27, 28 and a diode 29, 31 in series. A transistor 32 is connected between the line 25 and a +5-volt power source, while another transistor 33 is connected between line 26 and ground. A line 34 is connected to the base of transistor 32 and through a transistor 35 to the base of transistor 33. The output line 21 is connected through the gating circuitry to a resistor 36 and through 150 MF capacitor 37 to ground. The capacitor 37 is connected through a buffer amplifier 38 to a feedback line 39 leading to the summing junction 12 of a summing amplifier as indicated in FIG. 1. An offset circuit 41, which includes a +20-volt power source acting through a resistor network and a transistor 42, provides a second output from the balancer circuit which is similarly connected by line 43 to the summing junction 12 of the summing amplifier.

OPERATION

In the operation of the circuitry of FIG. 2 the gating circuit passes the balance signal from the summing amplifier 19 to the capacitor 37 during the fine positioning step and interrupts the passage of the signal, by effectively disconnecting the capacitor from the summing amplifier, during the coarse positioning step. A control signal is applied to line 34, the level of the signal being raised to +5 volts during the fine positioning and lowered to ground during the coarse positioning. The positive control signal applied to line 34 also turns off transistor 32 and allows negative values of the balance signal to pass through diode 29 to charge capacitor 37 in the negative direction. When the level of the control signal drops to ground, transistor 32 becomes saturated and clamps line 25 at +5 volts. At the same time, transistor 35 is turned on, thus passing current to transistor 33 and rendering it conductive which clamps line 26 at ground. By clamping the lines 25 and 26 at their respective levels, the capacitor is effectively disconnected from the summing amplifier and charging of the capacitor by the balance signal discontinued. During the fine positioning, when the balancer is turned on, the resistors 22, 27 or 28, and 36, along with capacitor 37, form a low-pass filter with a time constant of approximately 1.5 seconds. The low-pass filter limits the band width of the balancer forward channel to approximately 1/10 Hertz, so that balancer servo won't react to fast drifts of the order of 60 c.p.s., and effectively filters out such frequencies during the fine positioning. The large capacitor holds the charge when it is disconnected by the gating circuit. The two transistors 44 and 45 in the buffer amplifier 38 form a transconductance amplifier in which 1 volt input produces approximately 30 microamps output. The offset circuit loads the balancer to one side by continually dumping 60 micro amps on to line 43, so that the range of the balance circuit is between zero and +5 volts and the balance signal is of the same polarity. This avoids the circuit complexities and nonpolarized capacitor required by a signal which swings from plus to minus.

Since the large capacitor requires about 4 seconds to charge, a fast balancing action is provided to prevent damage during start up of the mechanism. This is accomplished by means of a high speed circuit including logic block 46, diode 47, resistor 48 and transistor 49, which bypasses the impedances 22 and 27 or 28 and "yanks" the capacitor up to approximately the charge level. When the power-on signal goes negative the output of the logic block 46 goes positive, thus back biasing the diode 47 and allowing the balance signal to pass through the emitter-follower 49 and resistor 36 into the capacitor. The time constant, which is the output impedance of transistor 49 plus the 51 ohms of resistor 36 and the 150 microfarads of capacitor 37, is typically 10 milliseconds. When the power-on signal goes positive, the output of logic block 46 goes to ground and effectively gates emitter-follower 49 out of the circuit.

Obviously many modifications and variations of the present invention are possible in the light of the above teachings. It is therefore to be understood that within the scope of the appended claims, the invention may be practiced otherwise than as specifically described.

What I claim is:

1. A balance circuit for neutralizing offset and drift in a DC servo which includes a circuit means for producing a motor position signal from a plurality of inputs to control the coarse and fine positioning of a movable load, comprising:

first means for developing a balance signal from the motor position signal during the fine positioning of the load; and second means connected to the first means for holding the balance signal and applying it to the circuit means during both the fine and coarse positioning of the load.

2. A balance circuit as recited in claim 1 including: gating means for interrupting the connection between the first means and the second means during the coarse positioning of the load.

3. A balance circuit as defined in claim 1 including: filter means for limiting the bandwidth of the balance circuit so that the second means is responsive only to low frequencies of less than 60 c.p.s.

4. A balance circuit as defined in claim 1 wherein: the first means includes comparison means for determining the difference between the motor drive signal and the inputs to the circuit means that are significant to the fine positioning of the load.

5. A balance circuit as defined in claim 1 including: control means for applying an initial approximate balance signal to the circuit means where the servo is initially activated.

6. A balance circuit as defined in claim 5 wherein: the second means includes a plurality of impedances in series with a capacitor, and the control means includes means for bypassing the impedances to reduce the time constant of the capacitor during a predetermined period after activation of the servo.

7. A balance circuit as defined in claim 1 including: means for loading the balance signal in one direction so that the signal has a constant polarity.